US010057453B2

(12) United States Patent
Dupas

(10) Patent No.: US 10,057,453 B2
(45) Date of Patent: Aug. 21, 2018

(54) METHOD OF PAIRING BETWEEN A UNIQUE IDENTIFIER OF A DEVICE FOR DIGITIZING DOCUMENTS AND A USER ACCOUNT IDENTIFIER

(71) Applicant: SAGEMCOM DOCUMENTS SAS, Rueil-Malmaison (FR)

(72) Inventor: Frédéric Dupas, Rueil Malmaison (FR)

(73) Assignee: SAGEMCOM DOCUMENTS SAS, Rueil-Malmaison (FR)

( * ) Notice: Subject to any disclaimer, the term of this patent is extended or adjusted under 35 U.S.C. 154(b) by 0 days.

(21) Appl. No.: 14/367,703

(22) PCT Filed: Dec. 19, 2012

(86) PCT No.: PCT/EP2012/076126
§ 371 (c)(1),
(2) Date: Jun. 20, 2014

(87) PCT Pub. No.: WO2013/092695
PCT Pub. Date: Jun. 27, 2013

(65) Prior Publication Data
US 2014/0362417 A1    Dec. 11, 2014

(30) Foreign Application Priority Data
Dec. 20, 2011   (FR) ..................... 11 62101

(51) Int. Cl.
*H04N 1/04* (2006.01)
*H04N 1/32* (2006.01)
*G06Q 10/10* (2012.01)

(52) U.S. Cl.
CPC ......... *H04N 1/32128* (2013.01); *G06Q 10/10* (2013.01)

(58) Field of Classification Search
CPC .......... G06F 21/30; G06F 21/31; G06F 21/44; G06F 21/45; G06F 21/46; G06F 21/33;
(Continued)

(56) References Cited

U.S. PATENT DOCUMENTS 6,826,592 B1 * 11/2004 Philyaw ............. G06F 9/44505
                                                         707/E17.112
7,433,068 B2 * 10/2008 Stevens ............. H04N 1/00957
                                                         358/1.15
(Continued)

FOREIGN PATENT DOCUMENTS

WO    WO 2005/106643 A2    11/2005

OTHER PUBLICATIONS

Translation of Jul. 8, 2014 International Preliminary Report on Patentability issued in International Patent Application No. PCT/EP2012/076126.
"Flowport User Guide 2.1.1 SP3 Update;" Xerox Corporation; pp. 1-160; Apr. 2003; XP002661275.
(Continued)

*Primary Examiner* — Dung D Tran
(74) *Attorney, Agent, or Firm* — Oliff PLC; R. Brian Drozd

(57) ABSTRACT

The present invention relates to the field of methods for associating a document digitization device with a user account within an online service. The invention describes a method of pairing wherein the online service generates a digital document containing the identifier of the user account in the form of a printable code. This document is then read by the device and dispatched by the device to the management service. The management service receiving a message which contains an identifier of the digitization device and the document containing a printable code of the identifier of the user account can decode this identifier and store the association between the two identifiers.

13 Claims, 3 Drawing Sheets

(58) Field of Classification Search
CPC .......... G06F 21/34; G06F 21/36; G06F 21/50; G06F 21/57; G06F 21/686; G06F 21/62; G06F 21/6218; G06F 21/629; G06F 21/6272; G06F 21/6236; G06F 14/30861; G06F 14/30011; G06F 14/3089; G06F 3/1209; G06F 3/1206; G06F 3/1236; G06F 3/1238; G06F 3/1273; G06F 3/1284; G06F 3/1288; G06F 3/1287; G06K 15/4095; H04N 1/001; H04N 1/00204; H04N 1/00228; H04N 1/00222; H04N 1/00236; H04N 1/00241; H04N 1/00244; H04N 1/00206; H04N 1/00326; H04N 1/00328; H04N 1/00331; H04N 1/00334; H04N 1/00344; H04N 1/00355
USPC .... 358/1.6, 3.28, 1.13, 1.15, 1.18, 403, 401, 358/402, 406, 407, 443, 442, 470, 471, 358/305, 396; 382/305, 306, 312, 317, 382/321; 707/758, 781, 667, 1; 715/205, 715/210, 750, 735, 737, 741, 745, 747, 715/866; 709/238, 244, 231

See application file for complete search history.

(56) References Cited

U.S. PATENT DOCUMENTS

| | | | | |
|---|---|---|---|---|
| 7,606,741 | B2* | 10/2009 | King | H04N 1/00244 |
| | | | | 235/379 |
| 8,619,287 | B2* | 12/2013 | King | G06F 17/243 |
| | | | | 358/1.15 |
| 9,288,209 | B2* | 3/2016 | Koeller | H04L 63/10 |
| 2006/0256392 | A1 | 11/2006 | Van Hoof et al. | |
| 2008/0045187 | A1* | 2/2008 | Sicart | H04L 29/12009 |
| | | | | 455/414.1 |
| 2010/0091313 | A1* | 4/2010 | Kitada | G06F 21/36 |
| | | | | 358/1.13 |
| 2013/0262309 | A1* | 10/2013 | Gadotti | G06Q 20/3276 |
| | | | | 705/44 |

OTHER PUBLICATIONS

International Search Report issued in International Patent Application No. PCT/EP2012/076126; dated May 21, 2014; with English-language translation.

* cited by examiner

METHOD OF PAIRING BETWEEN A UNIQUE IDENTIFIER OF A DEVICE FOR DIGITIZING DOCUMENTS AND A USER ACCOUNT IDENTIFIER

FIELD OF SOME ASPECTS OF THE INVENTION

The present invention concerns the field of methods for associating a document digitisation device with a user account within an online service.

The invention has been implemented in the field of the implementation of a fleet of document digitisation devices and online services for archiving and processing digital documents.

The fleet of document digitisation devices is administered by a frontal service for managing the devices which serves as a relay between these devices and the online services. The architecture of the system is illustrated by FIG. 1. A document digitisation device in the fleet 1.1 enables using one or more online services from a plurality of services 1.3, 1.4, 1.5 and 1.6. A service for managing the fleet 1.2 serves as a relay between the device 1.1 and the online services 1.3, 1.4, 1.5 and 1.6. The user of the document digitisation device 1.1 has an account on the online service, for example on the service 1.3. He can manage his account by connecting directly to the service from a computer 1.7. Typically, the user opens an account on the online service from the computer 1.7. Once the account is open, when the user uses his document digitisation device, the latter automatically connects to the fleet management service 1.2, which automatically relays to the associated online service.

BACKGROUND

In order for this service to operate, the fleet management service must be able to associate an identifier of document digitisation device which it will receive in the communications from the apparatus and a user account within an online service.

Giving information about a user identifier and a password directly on a document digitisation device for associating this apparatus with the user account is known. The apparatus can then transmit information to the fleet management service, which stores the association. However, this method requires the document digitisation device to have a peripheral enabling this information to be entered. This is not the case with all devices, and more particularly scanners in the example embodiment of the invention.

Using the serial number of the document digitisation device is also known. This number is normally inscribed on the apparatus. The user can then transfer it via the portal of the online service, using his access 1.7. The online service then retrieves the identifier and provides the fleet management service with the association between the identifier of the document digitisation device and the client account. This method has the drawback that the serial number is often inscribed in very small characters. In addition, since this number is unique within a large stock of equipment, it is relatively long, typically more than twenty alphanumeric characters. Manual copying by the user is therefore laborious and subject to errors in transcription.

BRIEF SUMMARY OF SOME ASPECTS OF THE INVENTION

The invention aims to solve the above problems by means of a pairing method wherein the online service generates a digital document containing the identifier of the user account in the form of a printable code. This document is then read by the device and sent by the device to the management service. The management service receiving a message that contains an identifier of the digitisation device and the document containing a printable code of the identifier of the user account can decode this identifier and store the association between the two identifiers.

The invention concerns a method for pairing between a unique document digitisation device identifier and an identifier of user account within an online service by said document digitisation device, a fleet management service serving as a relay between said apparatus and said online service, which comprises a step of triggering the pairing method; a step of reading a document comprising the identifier of the user account within an online service in the form of a printable code; a step of sending the document in digital form to a fleet management service serving as a relay between said apparatus and the online service; a step of awaiting the reception of a pairing confirmation and a step of receiving a pairing confirmation from the fleet management service.

According to a particular embodiment of the invention, the step of triggering the method is an automatic step performed when said apparatus is brought into service.

According to a particular embodiment of the invention, the step of triggering the method is an action by the user.

According to a particular embodiment of the invention, the step of reading a document comprising the identifier of a user account within an online service in the form of a printable code is performed using the document digitisation function included in the device.

According to a particular embodiment of the invention, the step of reading a document comprising the identifier of a user account within an online service in the form of a printable code is performed using an operation of reading the digital document on a peripheral that can be connected to the device.

The invention also concerns a method of pairing between a unique identifier of a document digitisation device and an identifier of a user account within an online service, a fleet management service serving as a relay between said apparatus and said online service, by said fleet management service, that comprises: a step of receiving, from an online service, a record relating to the subscription of a user; a step of storing the received record, including the identifier of user account; a step of receiving a digital document containing the identifier of a user account in the form of a printable code; a step of decoding the code contained in the received document; a step of generating the association between the unique identifier of the document digitisation device and the identifier of user account and a step of sending a pairing confirmation to the document digitisation device.

According to a particular embodiment of the invention, the step of decoding the code contained in the received document comprises a step of performing optical characters recognition in order to find the identifier, the latter being encoded in the form of characters.

According to a particular embodiment of the invention, the step of decoding the code contained in the received document comprises:
a step of reading a barcode in order to find the identifier, the latter being encoded in the form of a barcode.

According to a particular embodiment of the invention, the step of generating the association between the unique identifier of the document digitisation device and the identifier of user account comprises a step of verifying that the decoded account identifier is situated in one of the stored records.

The invention also concerns a document digitisation device that comprises: a unique identifier of the device; means for triggering the pairing; means for reading a document comprising the identifier of a user account within an online service in the form of a printable code; means for sending the document in digital form to a management service that serves as a relay between said device and the online service; means for awaiting reception of a pairing confirmation and means for receiving a pairing confirmation sent by the fleet management service.

The invention also concerns an information processing device for implementing a fleet management service serving as a relay between a document digitisation device and an online service, which comprises: means for receiving from an online service a record relating to the subscription of a user; means for storing the received record including the identifier of user account; means for receiving a digital document containing the identifier of a user account in the form of a printable code; means for decoding the code contained in the received document; means for generating the association between the unique identifier of the document digitisation device and the identifier of user account and means for sending a pairing confirmation to the document digitisation device.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION

It is assumed that the user has created his user account within the required online service. The user is therefore the owner of an account and has an identifier for this account. Advantageously, the account identifier is the connection user name, which may be his email address. However, the identifier of the user account may be any identifier defined by the online service that enables a unique and certain identification of the user account.

The implementation of the pairing is based on the sending, by the online service, of a document to the user. This document contains a printable code of the identifier of the user account of the user. This printable code may consist of a printing in print characters or a barcode in one or two dimensions. Any type of code may be used. The document may be sent to the user in print format or electronic format. Provision is made for the document to be entered in the digitisation device. A first embodiment is based on the digitisation of the paper document by the scanner. In this case, the document must have been sent in paper form or printed by the user if it was sent in electronic format. In a second embodiment, the document sent in digital form is entered in the scanner in the form of a document present on an external storage peripheral that can be connected to the device. Typically it is a peripheral known by the name USB key, which can be connected to the scanner, but any peripheral enabling the scanner to read the digital document can be used. It may also be a memory card or any other peripheral.

In the case where the digitisation device does not have network capabilities, this device is then connected to a host computer, which enables control thereof. This host computer has network capabilities affording communication with a fleet management service. It is then considered that the set consisting of digitisation device and host computer constitutes the digitisation device within the meaning of the patent.

Next, the user must perform an operation of pairing between at least one document digitisation device and his user account. This pairing is necessary so that the messages sent by the apparatus to the fleet management service are redirected to the required online service and associated with the appropriate user account.

Figure 1:
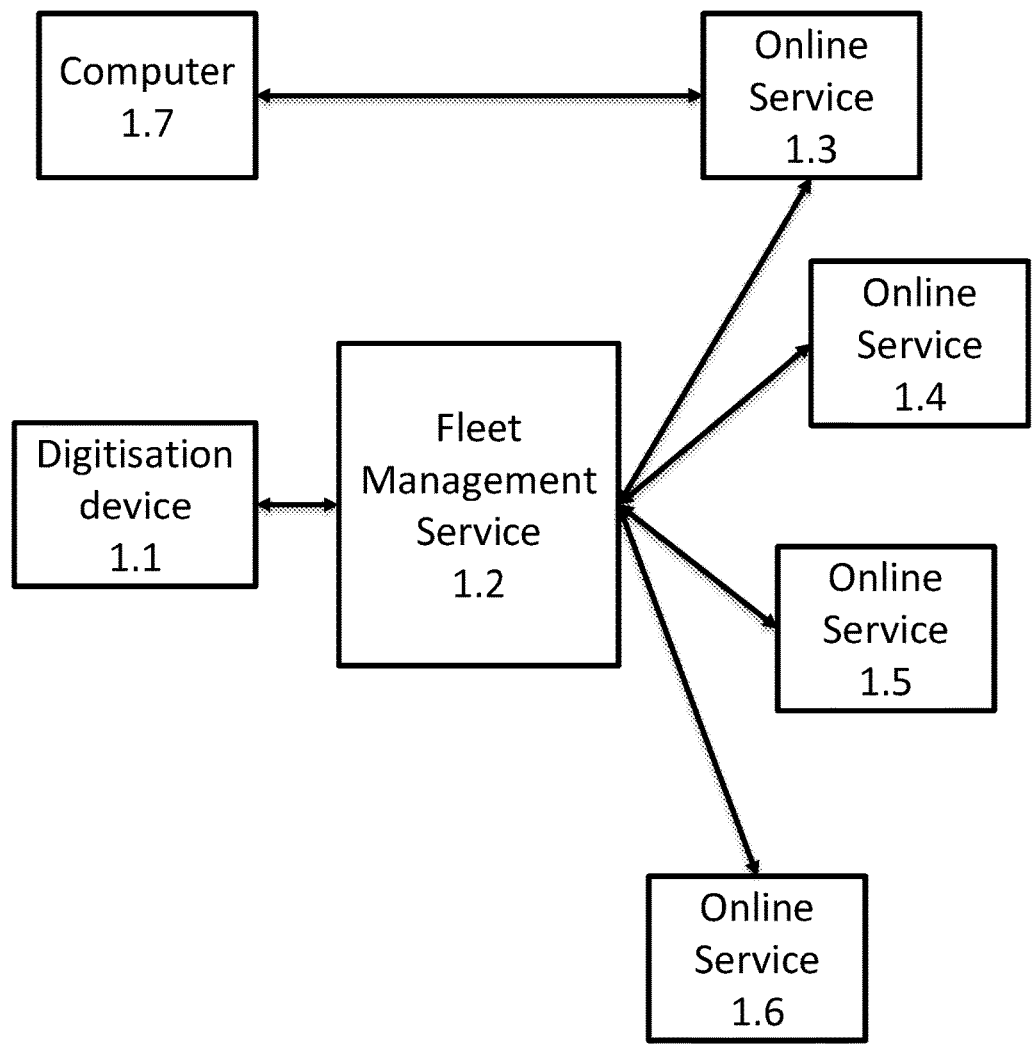
FIG. 1 illustrates the architecture of an example embodiment of the system.
Figure 2:
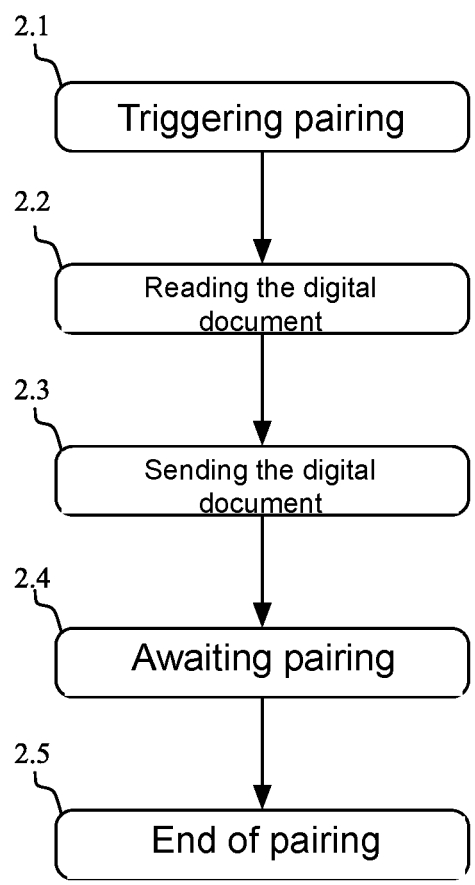
FIG. 2 illustrates the method of pairing by a document digitisation device according to an example embodiment of the invention.

The pairing method as implemented by the document digitisation device is illustrated by FIG. 2.

During a step 2.1, the pairing method is triggered. This triggering may be automatic when the apparatus is brought into service or triggered by an action by the user, for example pressing on a dedicated key.

During a step 2.2, the document digitisation device reads a document comprising the identifier of a user account within an online service in the form of a printable code. This reading step can be performed using the document digitisation function included in the device. Alternatively, it may be performed using an operation of reading the digital document on a peripheral that can be connected to the device.

During a step 2.3, the document digitisation device sends the document in digital form to a management service that serves as a relay between said device and the online service.

During a step 2.4, the document digitisation device waits until it receives a pairing confirmation.

During a step 2.5, the document digitisation device receives a pairing confirmation sent by the fleet management service.

Figure 3:
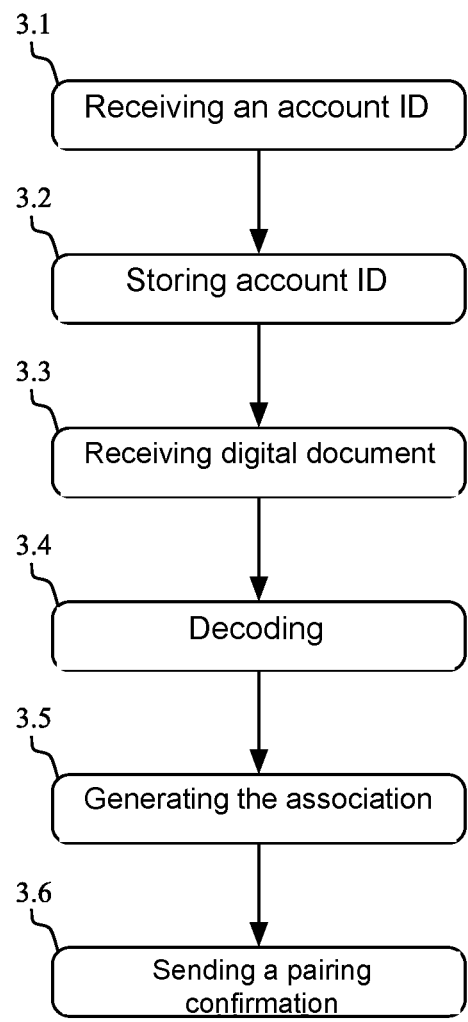
FIG. 3 illustrates the method of pairing by the service managing the fleet of apparatuses according to an example embodiment of the invention.

The pairing method as implemented by the fleet management service is illustrated by FIG. 3.

During a step 3.1, the fleet management service receives from an online service a record relating to the subscription of a user. This record contains at least one identifier of the concerned online service and an identifier of a user account within this service. Advantageously, this information may contain parameters for using the service.

During a step 3.2, the fleet management service stores the received record, including the identifier of user account.

During a step 3.3, the fleet management service receives a digital document containing the identifier of a user account in the form of a printable code. The document is sent by the document digitisation device in the form of a communication message. This message contains a unique identifier of the digitisation device. This identifier is an identifier that is sent by the apparatus during all its communications with the fleet management service. It is through this identifier that the fleet management service identifies the origin of the communications that reach it. It is possible for example to use the MAC address, meaning the layer 2 network address that is normally uniquely defined for any apparatus communicating over a network of the IP (Internet Protocol) type. However, any other identifier may be used, provided that it enables the fleet management service to identify the apparatus sending a message in a sure manner.

During a step 3.4, the fleet management service decodes the code contained in the received document. According to a first embodiment wherein the identifier is encoded in the form of characters, the fleet management service performs an optical character recognition (OCR) operation in order to find the identifier. In a second embodiment wherein the identifier is encoded it the form of a barcode, the fleet management service reads said barcode in order to find the user account identifier.

During a step 3.5, the fleet management service generates the association between the unique identifier of the document digitisation device and the identifier of user account. For this purpose, it checks that the decoded account identifier is situated in one of the records stored during a step 3.1. It can then associate the stored apparatus identifier with the received identifier of user account. If the check fails and the decoded user account identifier does not correspond to any stored record, an error message is sent to the device.

During a step 3.6, the fleet management service then sends a pairing confirmation to the document digitisation device.

Once the pairing is performed, the fleet management service is in a position to redirect all the traffic issuing from the document digitisation device and therefore marked by the unique identifier of the apparatus to the appropriate online service accompanied by the identifier of user account. Advantageously, it uses to do so any parameters received from the online service in the record containing the identifier of user account.

The invention claimed is:

1. A method for pairing between a unique identifier of a scanner and an identifier of user account within an online service, said method being implemented by said scanner and a fleet management service serving as a relay between said scanner and said online service, the method comprising:
   reading, by the scanner, a document comprising the identifier of the user account within the online service in the form of a printable code;
   sending, by the scanner, to said fleet management service a message comprising: (1) the unique identifier of the scanner, and (2) the document in digital form containing the identifier of the user account, wherein upon receipt of the message, the fleet management service (A) obtains the identifier of the user account from the document, (B) associates the identifier of the user account with the unique identifier of the scanner, (C) sends a pairing confirmation to the scanner;
   receiving, from the fleet management service, the pairing confirmation between the unique identifier of the scanner and the user account from the fleet management service; and
   only after receiving the pairing confirmation, redirecting subsequent messages sent by said scanner to the fleet management service directly to said online service and automatically associating the subsequent messages with said user account.

2. The method according to claim 1, wherein the method is automatically triggered when said scanner is brought into service.

3. The method according to claim 1, wherein the method is triggered by an action by the user.

4. The method according to claim 1, wherein reading the document comprising the identifier of the user account within the online service in the form of a printable code is performed using a document digitisation function included in the scanner.

5. The method according to claim 1, wherein reading a document comprising the identifier of the user account within the online service in the form of a printable code is performed by reading a digital document stored on a peripheral connected to the device.

6. A method of pairing between a unique identifier of a scanner and an identifier of a user account within an online service, a fleet management service serving as a relay between said scanner and said online service, said method being implemented by said fleet management service and comprising:
   receiving, by the fleet management service from the online service, a record relating to a subscription of a user, the record comprising the identifier of the user account;
   storing the received record, including the identifier of the user account;
   receiving, from the scanner, a message comprising (1) a document, scanned by the scanner, in digital form containing the identifier of the user account in the form of a printable code, and (2) the unique identifier of the scanner;
   decoding, by the fleet management service, the printable code contained in the received document in order to obtain the identifier of the user account;
   generating, by the fleet management service, an association between the unique identifier of the scanner and the identifier of the user account obtained by the decoding; and
   sending, by the fleet management service, a pairing confirmation to the scanner,
   wherein, after generating the association between the unique identifier of the scanner and the identifier of the user account, subsequent messages sent by said scanner to the fleet management service are redirected to said online service and associated with the user account corresponding to the identifier of the user account.

7. The method according to claim 6, wherein decoding the code contained in the received document uses optical character recognition for finding the identifier of the user account, the latter being encoded in the form of characters.

8. The method according to claim 7, wherein generating the association between the unique identifier of the scanner and the identifier of the user account comprises checking that the decoded account identifier corresponds to a stored record.

9. The method according to claim 6, wherein decoding the code contained in the received document comprises reading a barcode for finding the identifier of the user account, the latter being encoded in the form of a barcode.

10. The method according to claim 9, wherein generating the association between the unique identifier of the scanner and the identifier of the user account comprises checking that the decoded user account identifier corresponds to a stored record.

11. The method according to claim 6, wherein generating the association between the unique identifier of the scanner and the identifier of the user account comprises checking that the decoded account identifier corresponds to a stored record.

12. A system comprising:
   a scanner having a unique device identifier, the scanner:
      triggers a pairing between the unique identifier of the scanner and an identifier of user account within an online service; and reads a document comprising an identifier of a user account within an online service in the form of a printable code; and a fleet management service that serves as a relay between the scanner and the online service, wherein the scanner further:

sends a message comprising: (1) the unique identifier of the scanner, and (2) the document in digital form containing the identifier of the user account to the fleet management service, wherein upon receipt of the message, the fleet management service (A) obtains the identifier of the user account from the document, (B) associates the identifier of the user account with the unique identifier of the scanner, (C) sends a pairing confirmation to the scanner;

receives, from the fleet management service, the pairing confirmation between the unique identifier of the document digitisation device and the user account from the fleet management service, only after receiving the pairing confirmation, redirects subsequent messages sent by said scanner to the fleet management service directly to said online service and automatically associates the subsequent messages with said user account.

13. A system comprising a scanner and a fleet management service that serves as a relay between the scanner and an online service, wherein the fleet management service is configured to:

receive, from the online service, a record relating to a subscription of a user and comprising an identifier of a user account within the online service;

store the received record, including the identifier of the user account;

receive, from the scanner, a message comprising (1) a document, scanned by the scanner, in digital form containing an identifier of the user account in the form of a printable code, and (2) a unique identifier of the scanner;

decode the code contained in the received document in order to find the identifier of the user account;

generate an association between the unique identifier of the scanner and the identifier of the user account obtained by decoding; and send a pairing confirmation to the scanner, wherein, after generating the association between the unique identifier of the scanner and the identifier of the user account, subsequent messages sent by said scanner to the fleet management service are redirected to said online service and associated with the user account corresponding to the identifier of the user account.

* * * * *